Patented Dec. 25, 1951

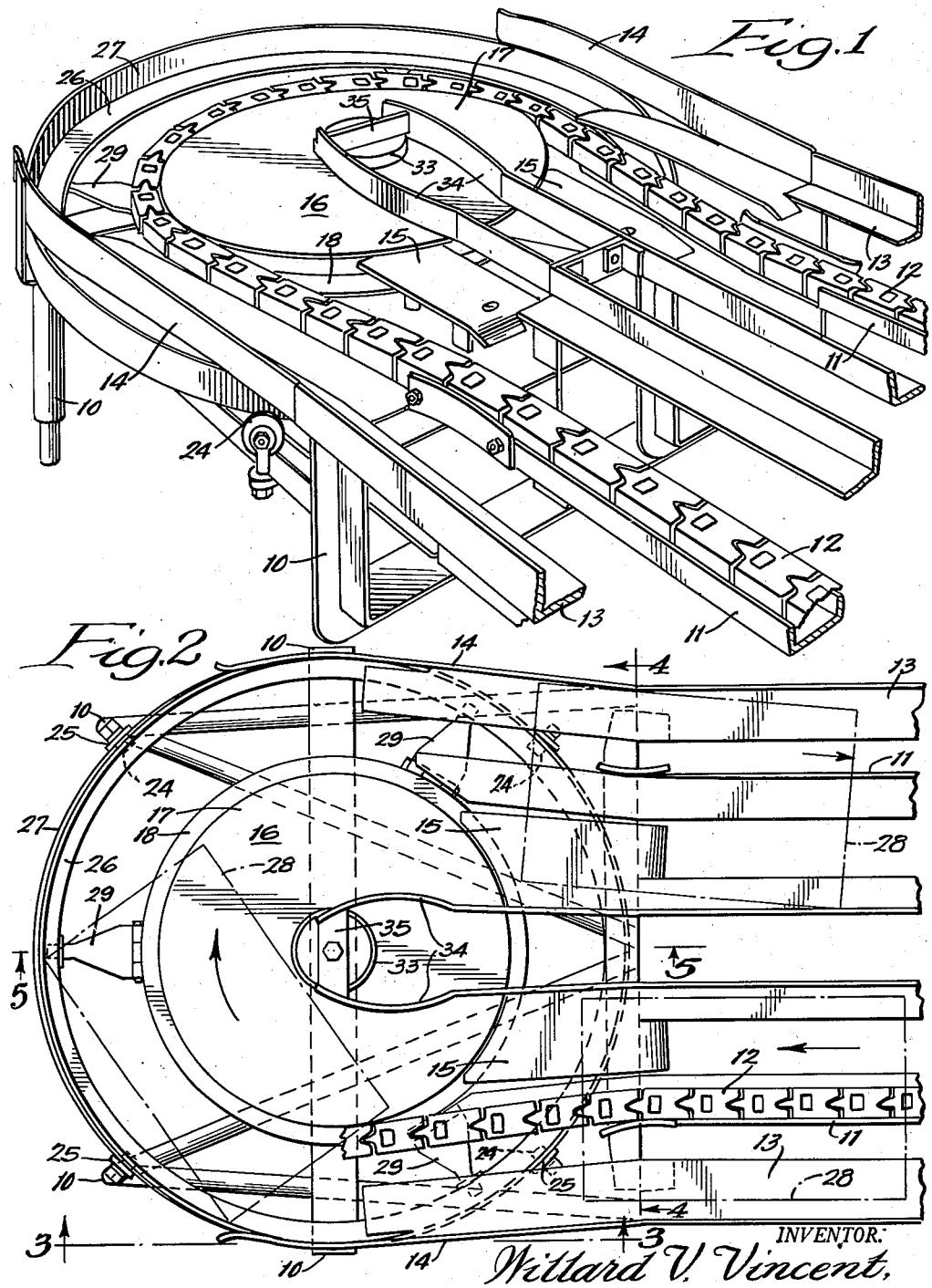

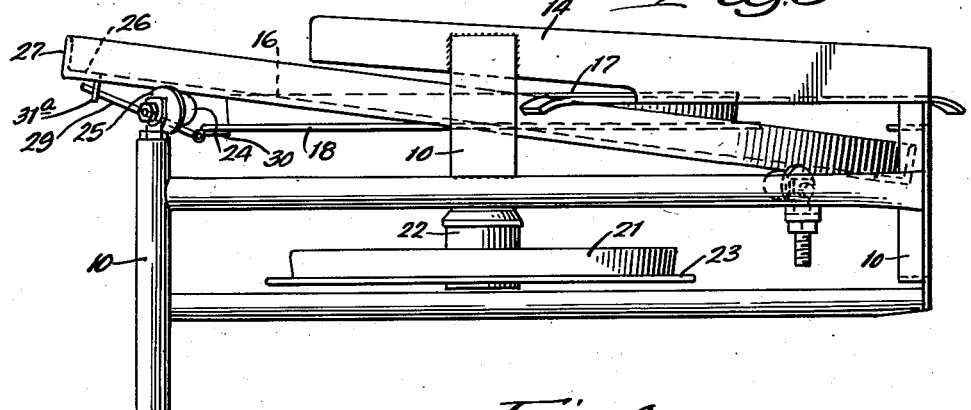
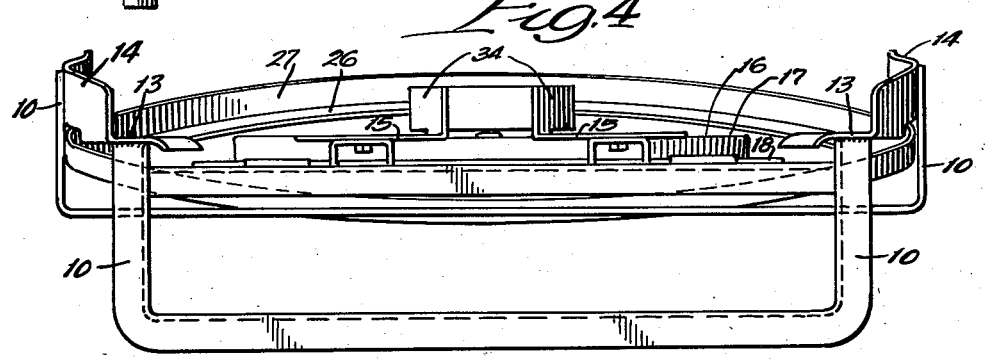
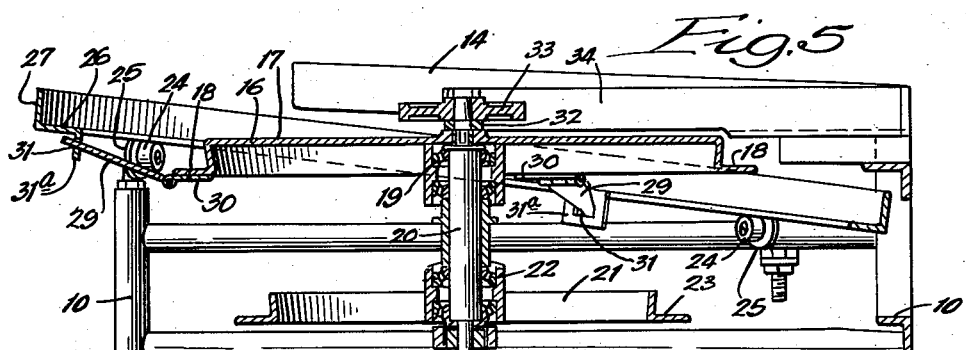
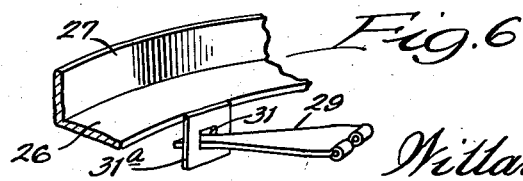

2,580,054

UNITED STATES PATENT OFFICE 2,580,054

CONVEYER WHEEL CURVE DEVICE

Willard V. Vincent, Chicago, Ill., assignor to The Lathrop-Paulson Company, Chicago, Ill., a corporation of Illinois Application March 31, 1950, Serial No. 153,180

8 Claims. (Cl. 198—181)

This invention relates to a conveyor wheel curve device and is particularly useful in connection with an endless conveyor equipped at one end with means for turning cases and the like about a curve of relatively short radius.

An object of the invention is to provide simple and effective means for turning cases and other objects carried by an endless conveyor through an arc of short radius at the end of parallel sections of the conveyor chain or other elements of an endless conveyor. Another object is to provide means at the end of substantially parallel portions of an endless conveyor for turning objects carried by the conveyor about the end while holding them against movement away from the conveyor. Other specific objects and advantages will appear as the specification proceeds.

The invention is shown in an illustrative embodiment by the accompanying drawings, in which—

Fig. 1 is a broken perspective view of apparatus embodying my invention; Fig. 2, a top plan view; Fig. 3, a broken side view in elevation, the view being taken as indicated at line 3—3 of Fig. 2; Fig. 4, a transverse sectional view, the section being taken as indicated at line 4—4 of Fig. 2; Fig. 5, a longitudinal sectional view, the section being taken as indicated at line 5—5 of Fig. 2; and Fig. 6, a broken detailed sectional view showing the means for connecting the outer wheel with the inner driving element.

In the embodiment of the invention illustrated, I provide an endless conveyor, such as a chain, carried upon substantially parallel tracks and with a drive wheel mounted at one end of the conveyor to receive the chain. I provide a larger wheel mounted upon rollers outside the drive wheel and having its outer end tilted upwardly so as to engage cases or other objects carried by the conveyor and to direct them from one parallel portion of the conveyor to the other, the outer wheel having its inner portion tilted below the track. Flexible connecting means are provided between the drive wheel and the outer wheel so that the two wheels move together. By this means, large cases or other objects are carried laterally from one of the parallel portions of the conveyor to the other and through an arc of very short radius so that the turning portion of the conveyor is hardly any wider than the portion of the conveyor through which the parallel tracks move. At the same time, the outer wheel provides a flange which is aligned with the endless conveyor and preferably rises above the endless conveyor so as to engage the cases and carry them laterally through the turning curve or arc.

In the specific illustration given, 10 designates a frame upon which are supported track members 11 carrying the endless conveyor chain 12. The track portions 11, as illustrated, have substantially parallel portions meeting at the curve where the reversal of direction is to take place. The frame 10 also provides lateral tracks 13 on each side of the tracks 11 for guiding the cases or other objects carried upon the conveyor 12. Since this structure is well known, a detailed description is believed unnecessary.

At the turning end of the structure, the casing 10 supports side flanges 14 which extend slightly laterally so as to guide the cases where they are swung slightly laterally in the turning movement, and there are also supported plates 15 which form a bridge between the flanges 14 and the turning wheels which will be described.

The drive wheel 16 supported within the frame 10 has a flat top surface 17 adapted to receive the cases or other objects being conveyed and the wheel is also provided at its periphery with a depending ledge or shelf 18 for receiving the conveyor chain 12. Thus as the conveyor chain moves, the wheel 16 is rotated. Any suitable means for mounting the wheel 16 within the frame 10 may be provided. In the illustration given, the wheel is supported upon a bearing structure 19 mounted upon a stationary post 20, as shown more clearly in Fig. 5. A similar wheel 21 may be likewise supported upon bearings 22 and may be provided with flanges 23 for receiving a lower chain (not shown) which may be a continuation of the conveyor chain 12, if desired. It will be understood that the wheel 21 may be omitted entirely at the option of the user.

Mounted within the frame 10 upon shafts are the rollers 24, preferably equipped with guide flanges 25, as illustrated best in Fig. 5. A large outer wheel 26 has a bottom flange received upon the roller portion 24 and with its outer periphery bearing against the guide flange 25 of the roller. Any suitable number of rollers, such as three, four, or any desired number, may be employed for rotatably carrying the outer wheel 26. Rollers are so positioned as to bring an outer portion of the wheel above the inner wheel or conveyor 12 while the inner portion of the wheel is tilted downwardly to a position below the conveyor 12, as shown very well in Fig. 5.

The outer wheel or guide wheel 26 is preferably equipped with a vertical flange 27 which serves to engage the case 28 or other object carried upon the conveyor and to carry it laterally and back into the return course of the conveyor, an illustrated case 28 being shown in Fig. 2.

While a freely rotatable wheel 26 may be employed without connection with the driving means, I find that excellent results are obtained by providing a flexible connection between the drive wheel and the guide wheel so that the two move in unison. Any suitable connecting means may be provided. In the illustration given, I provide a hinge member 29 connected to a hinge leaf 30 welded or otherwise secured to the bottom of the track flange 18, as shown best in Fig. 5. The hinge element 29 is preferably reduced in width at its outer end and is received within a slot 31 in the plate 31ª welded to the inner edge of the wheel 26, as shown best in Figs. 5 and 6. In the illustration given, three sets of the hinge elements are provided but it will be understood that any desired number may be used. The drive wheel 16 is designated a drive wheel by reason of the fact that it is connected to the outer wheel 26 and drives the outer wheel. However, in the illustration given, the drive wheel 16 is itself driven by the conveyor chain, which is preferably driven by sprocket means (not shown). In other words, the wheel 16, which serves as a driving means for the outer wheel 26, is mounted freely upon the fixed shaft 20 and is driven by the conveyor chain which leaves the parallel track portions 11 and extends about the outer flanged track 18 of the wheel 16.

The drive wheel 16 is preferably provided centrally with a hub 32 upon which is mounted a small central disk or wheel 33.

Over the drive wheel 16 I provide spaced flanges 34, as shown best in Figs. 1 and 2, and these serve as guides for the cases, keeping them upon the conveyor chain lengths 12. The two flanges 34 are connected by flange 35 at their forward ends and preferably the flanges terminate so as to expose the outer end portion of wheel 33. Thus as the case 28 is being turned (see Fig. 2) the outer end of rotating wheel 33 is also effective in the turning of the case bodily through an arc of very short radius to bring it back into the return course of the endless chain or conveyor.

*Operation*

In the operation of the conveyor, the endless conveyor chain 12 is driven by sprocket means (not shown) and is caused to move along its tracks 11 which are substantially parallel as to the portion herein concerned. The conveyor chain, leaving the parallel track portions 11, passes upon the drive wheel 16. Wheel 33 is rotated by the cases pressing against its periphery. The flexible hinge element 29 connecting the two wheels 16 and 26 cause the wheels to rotate together. The case 28 carried by the conveyor 12 engages the outer flange 27 of the wheel 26 and is turned within the very short radius illustrated in Fig. 2. Since the outer wheel portion 26 turns together with the wheel 16 and the small wheel 33 is free to rotate on a substantially frictionless bearing, there is a complete moving of the case through an arc of short radius by the combined action of these moving elements while at the same time without any substantial friction being exerted upon the case. Because the inner portion of the wheel 26 with its vertical flange 27 is supported in a tilted position well below the conveyor 12, there is no obstruction to the free movement of the conveyor 12 through the path shown. At the same time, the rotating wheel 26 with its vertical flange 27 receives the case at the end of its travel along one parallel stretch of the conveyor and together with wheel 16 rotates the case bodily into the adjacent parallel return stretch of the conveyor. By the means shown, the cases are turned bodily and without injury to them through an arc of extremely short radius. The reversal of movement is made smoothly and without bumping or jarring of the cases or other objects being carried.

The structure is compact, simple and inexpensive, while at the same time providing effective means for turning of the objects carried by the parallel conveyor chain. In the structure, the cases or packages go around a 180° turn, thus effecting a complete reversal of the path within a minimum of space.

In the illustration given, the two lengths of the continuous conveyor adjacent the turning wheel are substantially parallel. It will be understood, however, that the invention may be used with a continuous conveyor having the chains running in different relations while at the same time effecting the turning of objects carried by the conveyor between such related conveyor portions.

While in the foregoing specification I have set forth a specific structure in considerable detail, for the purpose of illustrating an embodiment of the invention, the details of structure may be varied widely by those skilled in the art without departing from the spirit of my invention.

I claim:

1. In conveyor apparatus, a frame, a pair of tracks carried thereby for an endless conveyor having their end portions lying adjacent each other, an endless conveyor in said tracks and forming a loop between said ends, an inner rotatably-mounted drive wheel receiving the looped portion of said conveyor, an outer wheel rotatably mounted in said frame with the outer portion of the wheel substantially aligned with the drive wheel and with the inner portion of the wheel in a plane below said drive wheel.

2. In conveyor apparatus, a frame, a pair of tracks carried thereby and terminating in spaced adjacent relation, an endless conveyor in said tracks and having a looped portion extending between the ends of said tracks, an inner wheel receiving said looped portion of the conveyor and rotated thereby, and an outer wheel rotatably supported in tilted relation on said frame, the outer portion of said wheel being in elevated position generally aligned with said inner wheel while the inner portion thereof is in a plane below said inner wheel, said outer wheel having a vertically-extending peripheral flange.

3. In conveyor apparatus, a frame, tracks for an endless conveyor having end portions terminating in adjacent relation, a drive wheel rotatably mounted in said frame, an endless conveyor mounted in said tracks and having its end looped portion carried by said drive wheel, rollers supported in said frame at different elevations, and an outer wheel carried by said rollers in tilted position with the highest portion of the wheel outermost and the lowest portion of the wheel innermost and below said conveyor.

4. In conveyor apparatus, a frame, tracks for an endless conveyor having end portions terminating in adjacent relation, a drive wheel rotatably mounted in said frame, an endless conveyor mounted in said tracks and having its end looped portion carried by said drive wheel, rollers supported in said frame at different elevations, an outer wheel carried by said rollers in tilted position with the highest portion of the wheel outermost and the lowest portion of the wheel innermost and below said conveyor, and means flexibly connecting the drive wheel and the outer wheel.

5. In conveyor apparatus, a frame, tracks for an endless conveyor having end portions terminating in adjacent relation, a drive wheel rotatably mounted in said frame, an endless conveyor mounted in said tracks and having its end looped portion carried by said drive wheel, rollers supported in said frame at different elevations, an outer wheel carried by said rollers in tilted position with the highest portion of the wheel outermost and the lowest portion of the wheel innermost and below said conveyor, and hinge means connecting the drive wheel and the outer wheel.

6. In conveyor apparatus, a frame, a pair of tracks for an endless conveyor having their ends terminating in adjacent spaced relation, an endless conveyor on said tracks and having a looped portion extending between said tracks, a drive wheel equipped with a depending annular flange receiving the loop portion of said conveyor, an inner wheel rotatably supported above said drive wheel, and an outer annular wheel provided with a raised flange, rollers mounted in said frame at different elevations to support said outer wheel in a tilted position so that an outer portion of the wheel extends above the conveyor and an inner portion thereof extends below the conveyor, and means flexibly connecting the outer wheel and said drive wheel.

7. In conveyor apparatus, a frame, a pair of tracks for an endless conveyor having their ends terminating in adjacent spaced relation, an endless conveyor on said tracks and having a looped portion extending between said tracks, a drive wheel equipped with a depending annular flange receiving the loop portion of said conveyor, an inner wheel carried by said drive wheel, and an outer annular wheel provided with a raised flange, rollers mounted in said frame at different elevations to support said outer wheel in a tilted position so that an outer portion of the wheel extends above the conveyor and an inner portion thereof extends below the conveyor, means flexibly connecting the outer wheel and said drive wheel, and an outer guide extending laterally of said conveyor tracks and forwardly thereof so as to lie in substantially parallel relation with the vertical flange of said outer wheel at a point where said flange rises above said conveyor.

8. In conveyor apparatus, a frame, a pair of substantially parallel track portions, terminating in adjacent spaced relation, side flanges on either side of said tracks, an endless conveyor carried by said tracks and providing a looped portion between the ends thereof, a rotatably-mounted drive wheel in said frame having a depending annular flange for receiving the looped portion of said conveyor, an inner disk carried centrally by said drive wheel, an outer wheel rotatably carried in said frame in a tilted position with an outer portion of the wheel extending above said conveyor and an inner portion of the wheel extending below said conveyor, and inner guide flanges in spaced relation extending over said drive wheel but terminating to expose the outer edge portion of said disk carried by said drive wheel.

WILLARD V. VINCENT.

No references cited.